(12) United States Patent
Xu

(10) Patent No.: US 11,109,319 B2
(45) Date of Patent: Aug. 31, 2021

(54) INFORMATION SHARING METHOD, WIRELESS COMMUNICATION METHOD, AND APPARATUSES THEREOF

(71) Applicant: Beijing Zhigu Rui Tuo Tech Co., Ltd., Beijing (CN)

(72) Inventor: Ran Xu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 0 days.

(21) Appl. No.: 16/734,124

(22) Filed: Jan. 3, 2020

(65) Prior Publication Data
US 2020/0145925 A1 May 7, 2020

Related U.S. Application Data

(62) Division of application No. 15/559,244, filed as application No. PCT/CN2016/075558 on Mar. 4, 2016, now Pat. No. 10,588,084.

(30) Foreign Application Priority Data

Mar. 27, 2015 (CN) .......................... 201510142182.0

(51) Int. Cl.
G08C 17/00 (2006.01)
H04W 52/02 (2009.01)
(Continued)

(52) U.S. Cl.
CPC ....... *H04W 52/0245* (2013.01); *H04L 1/0026* (2013.01); *H04L 5/0069* (2013.01);
(Continued)

(58) Field of Classification Search
CPC .. H04W 52/02; H04W 52/0203; H04W 84/12
See application file for complete search history.

(56) References Cited

U.S. PATENT DOCUMENTS 9,615,354 B2 * 4/2017 Hooli .................... H04W 48/08
2009/0290518 A1 11/2009 Gossain et al.
(Continued)

FOREIGN PATENT DOCUMENTS

CN 102037776 A 4/2011
CN 102570624 A 7/2012
(Continued)

OTHER PUBLICATIONS

International Search Report and Written Opinion for Application No. PCT/CN2016/075558, dated May 30, 2016, 7 pages.

*Primary Examiner* — Siren Wei
(74) *Attorney, Agent, or Firm* — Sheppard Mullin Richter & Hampton LLP

(57) ABSTRACT

Embodiments of the present application provide an information sharing method, a wireless communication method, and apparatuses thereof. The information sharing method comprises: determining information related to a channel state of at least one channel between a first device and an access point device; and sending the information to at least one second device located within a preset distance range of the first device. The methods and apparatuses of the embodiments of the present application share information related to a channel state according to adjacent relationship between devices, so as to be conducive to determining the channel state in a low complexity and low power consumption, thereby performing wireless communication in a short delay.

19 Claims, 9 Drawing Sheets

S220: Acquire information related to a channel state of at least one channel between at least one first device and an access point device, wherein the first device is located in a preset distance range of a second device S240: Conduct communication between the second device and the access point device at least based on the information

(51) Int. Cl.

| | | |
|---|---|---|
| *H04W 4/02* | (2018.01) | |
| *H04L 5/00* | (2006.01) | |
| *H04W 4/00* | (2018.01) | |
| *H04L 1/00* | (2006.01) | |
| *H04W 4/80* | (2018.01) | |
| *H04L 25/02* | (2006.01) | |
| *H04W 88/04* | (2009.01) | |
| *H04W 84/18* | (2009.01) | |
| *H04W 76/14* | (2018.01) | |

(52) U.S. Cl.
CPC ........ *H04L 5/0091* (2013.01); *H04L 25/0202* (2013.01); *H04W 4/00* (2013.01); *H04W 4/023* (2013.01); *H04W 4/80* (2018.02); *H04W 52/0229* (2013.01); *H04W 52/0254* (2013.01); *H04W 88/04* (2013.01); *H04W 76/14* (2018.02); *H04W 84/18* (2013.01); *Y02D 30/70* (2020.08)

(56) References Cited

U.S. PATENT DOCUMENTS

| | | | |
|---|---|---|---|
| 2010/0189065 A1* | 7/2010 | Bahk | H04W 72/121 370/329 |
| 2010/0272009 A1 | 10/2010 | Cheng et al. | |
| 2011/0134827 A1 | 6/2011 | Hooli et al. | |
| 2012/0161531 A1 | 6/2012 | Kim | |
| 2012/0230247 A1* | 9/2012 | Kwon | H04B 7/155 370/315 |
| 2013/0159407 A1 | 6/2013 | Koskela et al. | |
| 2013/0294331 A1* | 11/2013 | Wang | H04B 7/2606 370/315 |
| 2014/0177537 A1 | 6/2014 | Novak et al. | |
| 2014/0206346 A1 | 7/2014 | Kiukkonen et al. | |
| 2014/0293911 A1 | 10/2014 | Cheong et al. | |
| 2015/0030015 A1 | 1/2015 | Chu | |
| 2015/0173060 A1* | 6/2015 | Ge | H04W 72/04 370/252 |
| 2016/0088668 A1* | 3/2016 | Kim | H04W 4/70 370/315 |
| 2018/0092042 A1 | 3/2018 | Xu | |

FOREIGN PATENT DOCUMENTS

| | | |
|---|---|---|
| CN | 102932866 A | 2/2013 |
| CN | 103945507 A | 7/2014 |
| CN | 104144475 A | 11/2014 |
| WO | 2013184613 A2 | 12/2013 |
| WO | 2014201702 A1 | 12/2014 |

* cited by examiner

INFORMATION SHARING METHOD, WIRELESS COMMUNICATION METHOD, AND APPARATUSES THEREOF

CROSS-REFERENCE TO RELATED APPLICATION

The present application is a division of pending U.S. patent application Ser. No. 15/559,244, filed on Sep. 18, 2017, entitled "INFORMATION SHARING METHOD, WIRELESS COMMUNICATION METHOD, AND APPARATUS THEREOF", which is a National Phase Application of International Application No. PCT/CN2016/075558, filed on Mar. 4, 2016 and entitled "INFORMATION SHARING METHOD, WIRELESS COMMUNICATION METHOD, AND APPARATUS THEREOF", which is based on and claims priority to and benefit from Chinese Patent Application No. 201510142182.0 filed with the China National Intellectual Property Administration (CNIPA) on Mar. 27, 2015. The entire disclosures of all of the above-identified applications are incorporated herein by reference.

TECHNICAL FIELD

The present application relates to the field of wireless communication technologies, and in particular, to an information sharing method, a wireless communication method, and apparatuses thereof.

BACKGROUND

In a wireless transmission process, a multipath effect and the like may cause fading on a transmitted signal, and especially, for a broadband system, in order to demodulate the fading signal, a channel state needs to be estimated, and the channel state is crucial for both a sender and a receiver. For example, a transmitter knowing a channel state may implement an optimal emission design, and a receiver may perform a balancing operation on a received signal according to the channel state, thereby implementing accurate demodulation on the received signal. Generally, a parameter related to the channel state may be calculated according to the received signal.

SUMMARY

One exemplary objective of the present application is to provide an information sharing solution and a wireless communication solution, which are helpful for a device to determine a channel state and perform wireless communication in a low complexity and low power consumption.

In a first aspect, an embodiment of the present application provides an information sharing method, and the method comprises:
determining information related to a channel state of at least one channel between a first device and an access point device; and
sending the information to at least one second device located within a preset distance range of the first device.

In a second aspect, an embodiment of the present application provides a wireless communication method, and the method comprises:
acquiring information related to a channel state of at least one channel between at least one first device and an access point device, wherein the first device is located within a preset distance range of a second device; and
performing communication between the second device and the access point device at least based on the information.

In a third aspect, an embodiment of the present application provides an information sharing apparatus, and the apparatus comprises:
a first determination module, configured to determine information related to a channel state of at least one channel between a first device and an access point device; and
a first sending module, configured to send the information to at least one second device located within a preset distance range of the first device.

In a fourth aspect, an embodiment of the present application provides a wireless communication apparatus, and the apparatus comprises:
an acquisition module, configured to acquire information related to a channel state of at least one channel between at least one first device and an access point device, wherein the first device is located within a preset distance range of a second device; and
a communication module, configured to conduct communication between the second device and the access point device at least based on the information.

In a fifth aspect, an embodiment of the present application provides a computer readable storage device, comprising at least one executable instruction, which, in response to execution, causes a system comprising a processor to perform operations, comprising:
determining information related to a channel state of at least one channel between a first device and an access point device;
sending the information to at least one second device located within a preset distance range of the first device.

In a sixth aspect, an embodiment of the present application provides a device for information sharing comprising a processor and memory, wherein the memory storing computer executable instructions, the processor being connected with the memory via a communication bus, and when the device is operating, the processor executes or facilitates execution of the executable instructions stored by the memory:
determining information related to a channel state of at least one channel between a first device and an access point device;
sending the information to at least one second device located within a preset distance range of the first device.

In a seventh aspect, an embodiment of the present application provides a computer readable storage device, comprising at least one executable instruction, which, in response to execution, causes a system comprising a processor to perform operations, comprising:
acquiring information related to a channel state of at least one channel between at least one first device and an access point device, wherein the first device is located within a preset distance range of a second device; and
performing communication between the second device and the access point device at least based on the information.

In an eighth aspect, an embodiment of the present application provides a device for wireless communication comprising a processor and memory, wherein the memory storing computer executable instructions, the processor being connected with the memory via a communication bus, and when the device is operating, the processor executes or facilitates execution of the executable instructions stored by the memory:
acquiring information related to a channel state of at least one channel between at least one first device and an access point device, wherein the first device is located within a preset distance range of a second device; and performing communication between the second device and the access point device at least based on the information.

The methods and apparatuses of the embodiments of the present application share information related to a channel state according to adjacent relationship between devices, so as to be conducive to determining the channel state in a low complexity and low power consumption, thereby performing wireless communication in a short delay.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
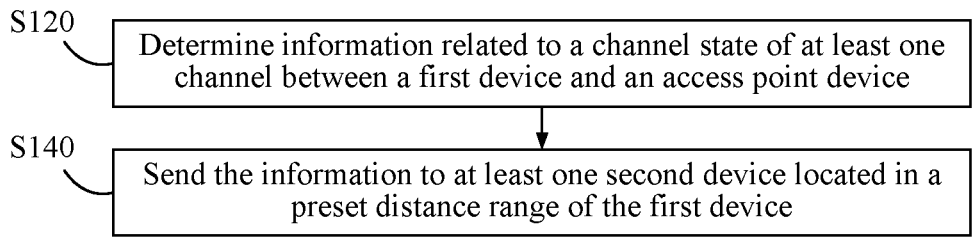
FIG. 1 is an example flow chart of an example of an information sharing method according to an embodiment of the present application.

The following further describes specific implementation manners of the present application in detail with reference to the accompanying drawings (the same reference numerals in several accompanying drawings indicate the same elements) and embodiments. The following embodiments are used to describe the present application, but are not intended to limit the scope of the present application.

In the following descriptions of the embodiments of the present application, the "first device" and "second device" may be any device with a wireless signal transmission function, and such device may comprise any terminal device, for example, a phone (e.g. a cellular phone or a smart phone), a computer (e.g. a notebook computer), a portable communication device, a portable computing device (e.g. a personal digital assistant), an entertainment device (e.g. a music or video device, or a satellite radio device), a global positioning system device, or any other suitable device configured to communication through a wireless medium. To implement the technical solutions of the embodiments of the present application, the first device and the second device may have communication functions corresponding to different communication manners between them. Moreover, in the embodiments of the present invention, the "first" and "second" are used to distinguish different roles in an information sharing process, which neither indicate any special technical meaning, nor indicate a necessary logic sequence between them. In addition, in the embodiments of the present application, the access point device may comprise, be implemented as, or be referred to as a node B, an evolved node B (eNode B), a radio network controller (RNC), a base station controller (BSC), a base transceiver station (BTS), a base station (BS), a transceiver function (TF), a wireless router, a wireless transceiver, a basic service set (BSS), an extended service set (ESS), a radio base station (RBS), or another term.

Along with the advancement of technologies and ever maturing of the market, the average number of electronic devices owned by people is increasing, and a user generally may carry more than one electronic device, for example, a smart phone and a smart watch, and the devices may be interconnected in various possible short distance wireless communication manners, such as Bluetooth, WiFi, infrared, Zigbee, near field communication (NFC), and visible light communication. The devices may access the same access point device at the same time, and perform respective data communication. If the devices are close enough, for example, within a wavelength range of a quarter of an electromagnetic wave, channel states between the two and the same access point device may be considered to be the same. Based on this, the present application provides a new information sharing solution and a wireless communication solution.

Referring to FIG. 1, a flow chart of an information sharing method according to an embodiment of the present application is shown. The method may be executed by an apparatus belonging to a first device, and may also be executed by an apparatus independent to the first device. As shown in FIG. 1, the method comprises:

S120: Determine information related to a channel state of at least one channel between a first device and an access point device.

In the information sharing method of the embodiment of the present application, the information related to the channel state of at least one channel between the first device and the access point device may comprise, but not limited to various types of information that can reflect channel attributes of the at least one channel between the first device and the access point device, such as Channel State Information (CSI), a channel matrix, a multipath delay, a Doppler frequency offset, a rank of an MIMO channel, a beam forming vector, signal scattering, environment fading (fading, multipath fading or shadowing fading), and power decay of distance. In step S120, the information may be determined according to a mature technology in this field, for example, according to a received signal from the access point device. If the execution apparatus of the method is independent to the first device, the information may be acquired directly in a manner of communicating with the first device.

S140: Send the information to at least one second device located within a preset distance range of the first device.

As described above, when the two devices are close to each other, the respective channel states between the two and the same access point device may be considered as to be the same. Therefore, in the method of this embodiment, the preset distance range may be set in advance according to factors, such as a communication environment and a communication frequency band, and the preset distance range may be any distance range that enables the respective channel states between the two devices and the same access point device to be substantially consistent.

In view of the foregoing, the method of the embodiment of the present application shares information related to a channel state according to adjacent relationship between devices, so as to be conducive to determining the channel state in a low complexity and low power consumption, thereby performing wireless communication in a short delay.

In an implementation manner of determining the information related to the channel state according to the mature technology in this field, step S120 may further comprise:

S122: Acquire a data signal from the access point device and received by the first device.

If the method of this embodiment is executed by an apparatus independent to the first device, the data signal from the access point device and received by the first device may be acquired in a manner of communicating with the first device.

S124: Determine information related to a channel state of at least one channel between the first device and the access point device at least based on the data signal. Determining a channel state according to a received signal is a mature technology in this field, and is not repeated herein.

Moreover, the method may further comprise:

S110: Determine at least one second device located within a preset distance range of the first device.

According to different roles of the execution apparatus of the method of this embodiment, in a possible implementation manner, one or more second devices within the preset distance range of the first device may be acquired in a manner of communicating with the first device. In another possible implementation manner, the execution apparatus of the method of this embodiment may determine one or more second devices within the preset distance range of the first device by using various other possible mechanisms. Specifically:

Step S110 may comprise:

S112: Determine the at least one second device from devices that have established communication connections with the first device. Optionally, the established communication connection may be a short distance communication connection, and may comprise, but not limited to: Bluetooth, WiFi, infrared, Zigbee, near field communication (NFC), visible light communication, and the like. Two devices that have established the short distance communication connection are close to each other, and one or more second devices may be determined from devices that establish communication connections with the first device in such manner. For example, a user carries devices such as a smart band, a mobile phone, and a tablet computer, and the devices have established short distance communication connections with each other through Bluetooth.

Alternatively, Step S110 may comprise:

S114: Determine the at least one second device according to a proximity sensor.

In the method of this embodiment, the proximity sensor is mainly configured to detect existence of a target device within a certain distance range of the first device in a non-contact manner. According to the sensing capability of the used proximity sensor, one or more devices within the preset distance range may be detected according to the proximity sensor, thereby determining the at least one second device. The accuracy of determining the at least one second device may further be improved by combining step S112. For example, according to a sensing result of the proximity sensor, a part of devices that have established communication connections with the first device but are beyond the preset distance range may be excluded, thereby further determining the at least one second device.

Further, Step S110 may comprise:

S116: Determine the at least one second device at least according to relative positions of other devices and the first device.

In one embodiment, the apparatus executing the method of this embodiment can acquire position information of the first device and one or more other devices, for example, but not limited to, by using any possible locating method, and therefore, the apparatus can determine relative positions between the first device and the one or more other devices, thereby further determining the at least one second device within the preset distance range.

In addition to determining the at least one second device adjacent to the first device by using, but not limited to, several possible manners of the foregoing example, the apparatus executing the method of this embodiment may determine the at least one second device by querying directly, thereby sending, to the determined at least one second device, the information related to the channel state determined in step S120. In such an implementation manner, the method may further comprise:

S130: Send a query message, wherein the query message is used to query another device whether the information related to the channel state of the at least one channel between the first device and the access point device is needed.

In a case that the at least one second device has not been determined yet, in step S130, the query message may be sent by broadcasting, that is, step S130 may comprise:

S132: Send the query message by broadcasting.

Or, the execution apparatus of the method of this embodiment has known or has determined at least one second device by using, but not limited to, several possible manners of the foregoing example. In step S130, query may be initiated directly to the at least one second device by using identification information (for example, a MAC address) of the at least one second device.

In a case that the at least one second device is not determined, step S110 may be executed after step S130, and step S110 may comprise:

S118: Determine the at least one second device at least according to a response to the query message.

After sending the query message, the execution apparatus of the method of this embodiment may receive a response to the query message from another device, and the response may be from another device directly or may be from the first device. Moreover, step S118 may further comprise:

S1182: Determine the distance between a device corresponding to the response and the first device at least according to the response to the query message.

Optionally, the distance between the device corresponding to the response and the first device may be determined according to a Received Signal Strength Indication (RSSI), that is, the signal strength of a response signal. In an implementation manner that the response signal comprises position information of the corresponding device, the distance between the two may be determined according to the position information of the device corresponding to the response signal and position information of the first device. The distance between the device corresponding to the response and the first device may be determined by using any other possible manner.

S1184: Determine the at least one second device at least according to the determined distance.

In still another possible implementation manner, when receiving or demodulating the data signal of the access point device, another device may actively initiate, to the first device, a request message for the information related to the channel state of the at least one channel between the first device and the access point device. In such an implementation manner, the method may further comprise:

S130': Receive a request message for the information related to the channel state of at least one channel between the first device and the access point device.

In a case that the at least one second device has not been determined yet, step S110 may be executed after step S130', and step S110 may comprise:

S118': Determine the at least one second device at least according to the request message.

Optionally, step S118' may further comprise:

S1182': Determine the distance between a device corresponding to the request message and the first device at least according to the request message.

Optionally, the distance between the device corresponding to the request message and the first device may be determined according to the RSSI, that is, the signal strength of the request signal. In an implementation manner that the request signal comprises position information of the corresponding device, the distance between the two may be determined according to the position information of the device corresponding to the request message and position information of the first device. The distance between the device corresponding to the request message and the first device may be determined by using any other possible manner.

S1184': Determine the at least one second device at least according to the determined distance.

After the distance between the corresponding device and the first device is determined, a device located within the preset distance range is determined as the at least one second device.

In view of the foregoing, the method of this embodiment shares the parameter related to a channel state according to proximity relationship between devices, so that each device does not need to calculate a parameter related to the channel state respectively, thereby being conducive to determining the channel state in a low complexity and low power consumption, and performing wireless communication in a short delay.

Figure 2:
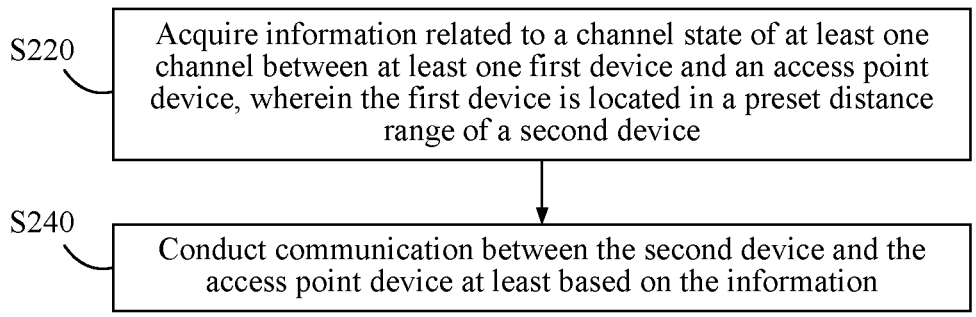
FIG. 2 is an example flow chart of an example of a wireless communication method according to an embodiment of the present application.

The present application further provides a wireless communication method, and as shown in FIG. 2, a flow chart of a wireless communication method according to an embodiment of the present application is shown. The method may be executed by any second device, or executed by an apparatus independent to any second device. As shown in FIG. 2, the method comprises:

S220: Acquire information related to a channel state of at least one channel between at least one first device and an access point device, wherein the first device is located within a preset distance range of a second device.

In the wireless communication method of the embodiment of the present application, when the second device needs to receive or demodulate a data signal from the access point device, the execution apparatus of the method of this embodiment actively acquires the information related to the channel state of at least one channel between at least one first device and the same access point device, wherein the first device is located within a preset distance range of the second device; therefore, the second device does not need to determine the information by using own calculation resources and time. The information related to the channel state of at least one channel between the at least one first device and the access point device may comprise, but not limited to various types of information that can reflect channel attributes of the at least one channel between any first device and the access point device, such as Channel State Information, a channel matrix, a multipath delay, a Doppler frequency offset, a rank of an MIMO channel, a beam forming vector, signal scattering, environment fading, and power decay of distance. The preset distance range may be set in advance according to factors, such as a communication environment and a communication frequency band, and the preset distance range may be any distance range that enables channel states between the two devices and the same access point device to be substantially consistent.

S240: Perform communication between the second device and the access point device at least based on the information.

As described above, when the two devices are close to each other, channel states between the two and the same access point device may be considered as to be the same. Therefore, in the method of this embodiment, based on the information acquired in step S220, the second device can perform communication with the access point device, such as demodulate the data signal from the access point device.

In view of the foregoing, the method of this embodiment can acquire the information related to the channel state based on the proximity relationship between devices, thereby being capable of performing wireless communication in a low complexity, low power consumption and a short delay.

Moreover, step S220 may further comprise:

S222: Determine at least one first device located within a preset distance range of the second device.

According to different roles of the execution apparatus of the method of this embodiment, in a possible implementation manner, one or more first devices within the preset distance range of the second device may be known in a manner of communicating with the second device. In another possible implementation manner, the execution apparatus of the method of this embodiment may determine one or more first devices in the preset distance range of the second device by using various other possible mechanisms. Specifically:

Step S222 may comprise:

S222: Determine the at least one second device from devices that have established communication connections with the second device. Optionally, the established communication connection may be a short distance communication connection, and may comprise, but not limited to: Bluetooth, WiFi, infrared, Zigbee, near field communication (NFC), visible light communication, and the like. Two devices that have established the short distance communication connection are close to each other, and one or more first devices may be determined from devices that establish communication connections with the second device in such manner.

Or, Step S222 may comprise:

S2224: Determine the at least one first device at least according to a proximity sensor.

In the method of this embodiment, the proximity sensor is mainly configured to detect existence of a target device within a certain distance range of the second device in a non-contact manner. According to the sensing capability of the used proximity sensor, one or more devices within the preset distance range may be detected according to the proximity sensor, thereby determining the at least one first device. The accuracy of determining the at least one first device may further be improved by combining step S2222. For example, according to a sensing result of the proximity sensor, a part of devices that have established communication connections with the second device but are out of the preset distance range may be excluded, thereby further determining the at least one first device.

Further, Step S222 may comprise:

S2226: Determine the at least one first device at least according to relative positions of other devices and the second device.

In a possible manner, the apparatus executing the method of this embodiment can acquire position information of the second device and one or more other devices, for example, but not limited to, by using any possible location method, and therefore, the apparatus can determine relative positions between the second device and the one or more other devices, thereby further determining the at least one first device.

In addition to determining the at least one first device adjacent to the second device by using, but not limited to, the several possible manners described above, the apparatus executing the method of this embodiment may determine the at least one first device by sending a request for the information, thereby acquiring the information related to the channel state that is determined by the at least one first device. In such an implementation manner, the method may further comprise:

S210: In response to the data signal from the access point device and received by the second device, send a request message for the information to request another device for the information.

In a case that the at least one first device has not been determined yet, in step S210, the request message may be sent by broadcasting, that is, step S210 may further comprise:

S212: Send the request message by broadcasting.

Or, the execution apparatus of the method of this embodiment has known or has determined at least one first device by using, but not limited to, several possible manners of the foregoing example, in step S210, request may be sent directly to the at least one first device by using identification information (for example, a MAC address) of the at least one first device.

In a case that the at least one first device is not determined, step S222 may be executed after step S210, and step S222 may comprise:

S2228: Determine the at least one first device at least according to a response to the request message. In a possible implementation manner, after the at least one first device is determined, the execution apparatus of the method of this embodiment may request the at least one device for the information with various possible short distance communication manners; in another possible implementation manner, the response may comprise the information related to the channel state of the at least one channel between the corresponding device and the access point device.

In a possible implementation manner, the step S2228 may further comprise:

S22282: Determine the distance between a device corresponding to the response and the second device at least according to the response to the request message.

Optionally, the distance between the device corresponding to the response and the second device may be determined according to a Received Signal Strength Indication (RSSI), that is, the signal strength of a response signal. In an implementation manner that the response signal comprises position information of the corresponding device, the distance between the two may be determined according to the position information of the device corresponding to the response signal and position information of the second device. The distance between the device corresponding to the response and the second device may be determined by using any other possible manner.

S22284: Determine the at least one first device at least according to the determined distance.

After the distance between the corresponding device and the second device is determined, a device located within the preset distance range is determined as the at least one first device.

Moreover, as shown in the foregoing, step S240 may further comprise:

S242: At least based on the information, demodulate the data signal from the access point device and received by the second device.

Moreover, in step S220, the information may be acquired from the at least one first device in any of the following possible communication manners, such as Bluetooth, WiFi, infrared, Zigbee, near field communication NFC, and visible light communication. If the information related to the channel state is acquired from at least two first devices, the at least two pieces of information related to the channel state may be considered comprehensively, for example, in a process of communication of the second device and the access point device, an average value of parameters comprised in the two pieces of channel state information is used.

In view of the foregoing, the method of this embodiment performs wireless communication by using the shared parameter related to the channel state according to the adjacent relationship between devices, and therefore, the complexity, power consumption and delay are all reduced.

A person skilled in the art should understand that in the foregoing method of the specific implementation manner of the present application, serial numbers of steps do not indicate priorities of execution sequences, the execution sequences of the steps should be determined according to functions and inner logic thereof, and should not constitute a limitation to implementation processes of the specific implementation manner of the present application.

A person skilled in the art should understand that in the foregoing method of the specific implementation manner of the present application, serial numbers of steps do not indicate priorities of execution sequences, the execution sequences of the steps should be determined according to functions and inner logic thereof, and should not constitute a limitation to implementation processes of the specific implementation manner of the present application.

In addition, an embodiment of the present application further provides a computer readable medium, comprising computer readable instructions for performing the following operations when being executed: executing operations of the steps in the method in the implementation manner shown in FIG. 1.

An embodiment of the present application further provides a computer readable medium, comprising computer readable instructions for performing the following operations when being executed: executing operations of the steps in the method in the implementation manner shown in FIG. 2.

An embodiment of the present invention further provides an apparatus executing the information sharing method. The apparatus may be an apparatus independent to a first device, and may also belong to the first device. According to requirements of different execution roles of the device, in addition various components described in the following, the apparatus may further comprise a communication module that may implement communication with any device external to the apparatus as required. As shown in FIG. 3(*a*), an information sharing apparatus 300 of the embodiment of the present application comprises: a first determination module 320 and a first sending module 340.

The first determination module 320 is configured to determine information related to a channel state of at least one channel between a first device and an access point device.

In the information sharing apparatus of the embodiment of the present application, the information related to the channel state of at least one channel between the first device and the access point device may comprise, but not limited to various information that can reflect channel attributes of the at least one channel between the first device and the access point device, such as Channel State Information, a channel matrix, a multipath delay, a Doppler frequency offset, a rank of an MIMO channel, a beam forming vector, signal scattering, environment fading, and power decay of distance. Moreover, the first determination module 320 may determine the information according to a mature technology in this field, for example, according to a received signal from the access point device. If the apparatus 300 of this embodiment is independent to the first device, the information may be acquired directly in a manner of communicating with the first device.

The first sending module 340 is configured to send the information to at least one second device located within a preset distance range of the first device.

As described above, when the two devices are close to each other, the respective channel states between the two and the same access point device may be considered as to be the same. Therefore, in the apparatus of this embodiment, the preset distance range may be set in advance according to factors such as a communication environment and a communication frequency band, and the preset distance range may be any distance range that enables the respective channel states between the two devices and the same access point device to be substantially consistent.

In view of the foregoing, the apparatus of this embodiment shares information related to a channel state according to adjacent relationship between devices, so as to be conducive to determining the channel state in a low complexity and low power consumption, thereby performing wireless communication in a short delay.

Figure 3A:
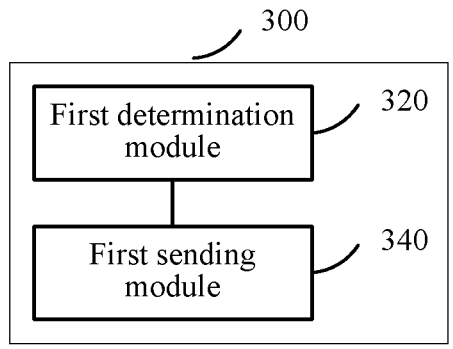
FIG. 3(a) to FIG. 3(j) are example structural block diagrams of several examples of an information sharing apparatus according to an embodiment of the present application.
Figure 3B:
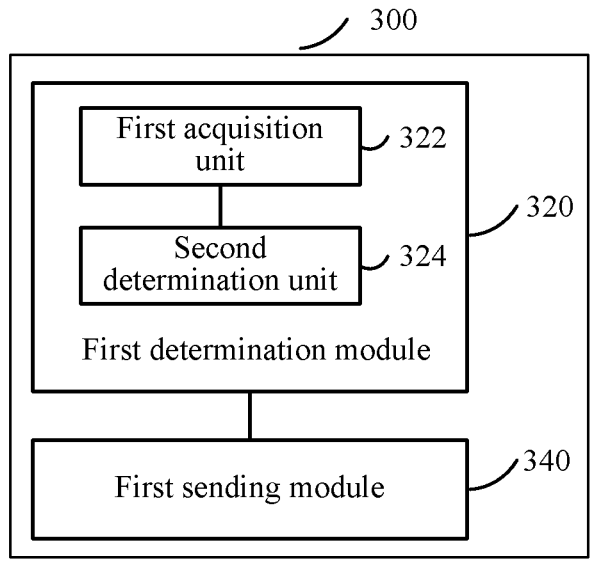

In an implementation manner in which the first determination module 320 determines the information related to the channel state according to a mature technology in this field, as shown in FIG. 3(b), the first determination module 320 may further comprise: a first acquisition unit 322 and a second determination unit 324.

The first acquisition unit 322 is configured to acquire a data signal from the access point device and received by the first device.

If the apparatus 300 of this embodiment is independent to the first device, the first acquisition unit 322 may acquire the data signal from the access point device and received by the first device in a manner of communicating with the first device.

The second determination unit 324 is configured to determine information related to a channel state of at least one channel between the first device and the access point device at least based on the data signal. Determining a channel state according to a received signal is a mature technology in this field, and is not repeated herein.

Figure 3C:
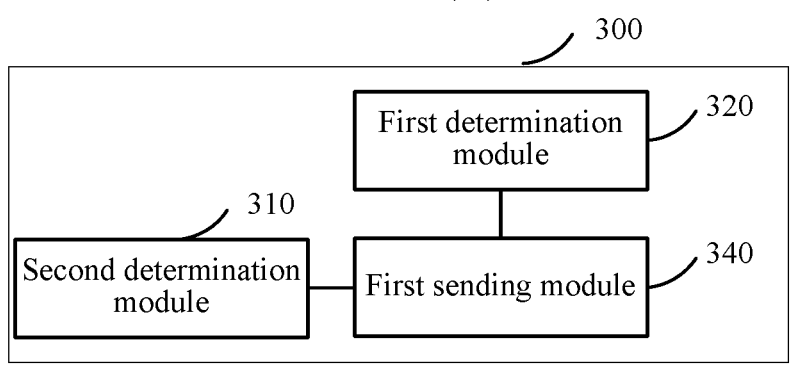

Moreover, as shown in FIG. 3(c), the apparatus 300 may further comprise:

a second determination module 310, configured to determine at least one second device located within a preset distance range of the first device.

Figure 3D:
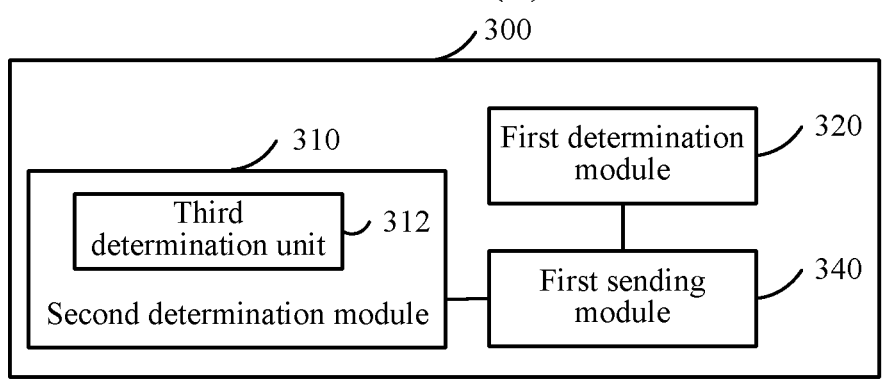

According to different roles of the apparatus of this embodiment, in a possible implementation manner, the second determination module 310 may acquire one or more second devices within the preset distance range of the first device in a manner of communicating with the first device. In another possible implementation manner, the second determination module 310 may determine one or more second devices within the preset distance range of the first device by using various other possible mechanisms. Specifically:

As shown in FIG. 3(d), the second determination module 310 may comprise:

a third determination unit 312, configured to determine the at least one second device from devices that have established communication connections with the first device. Optionally, the established communication connection may be a short distance communication connection, and may comprise, but not limited to: Bluetooth, WiFi, infrared, Zigbee, NFC, visible light communication, and the like. Two devices that have established the short distance communication connection are close to each other, and the third determination unit 312 may determine one or more second devices from devices that establish communication connections with the first device in such manner.

Figure 3E:
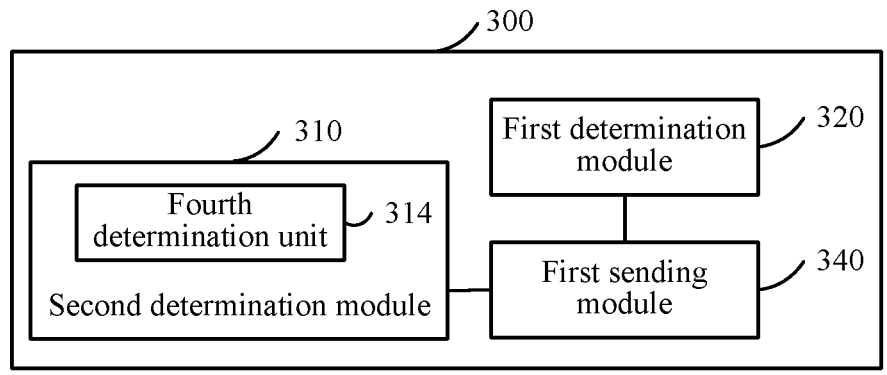

Or, as shown in FIG. 3(e), the second determination module 310 may comprise:

a fourth determination unit 314, configured to determine the at least one second device at least according to a proximity sensor.

In the apparatus of this embodiment, the proximity sensor is mainly configured to detect existence of a target device within a certain distance range of the first device in a non-contact manner. According to the sensing capability of the used proximity sensor, one or more devices within the preset distance range may be detected according to the proximity sensor, thereby determining the at least one second device. The accuracy of determining the at least one second device may further be improved by combining the third determination unit 312. For example, according to a sensing result of the proximity sensor, a part of devices that have established communication connections with the first device but are beyond the preset distance range may be excluded, thereby further determining the at least one second device.

Figure 3F:
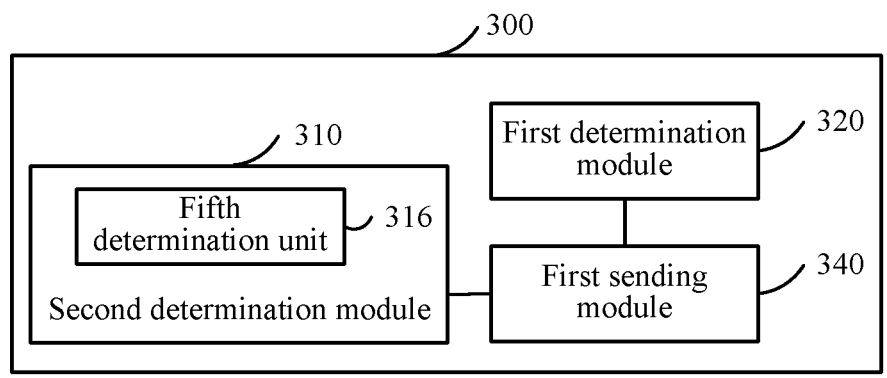

Further, as shown in FIG. 3(f), the second determination module 310 may comprise:

a fifth determination unit 316, configured to determine the at least one second device at least according to relative positions of other devices and the first device.

In a possible manner, the apparatus of this embodiment can acquire position information of the first device and one or more other devices, for example, but not limited to, by using any possible location method, and therefore, the apparatus can determine relative positions between the first device and the one or more other devices, thereby further determining the at least one second device within the preset distance range.

Figure 3G:
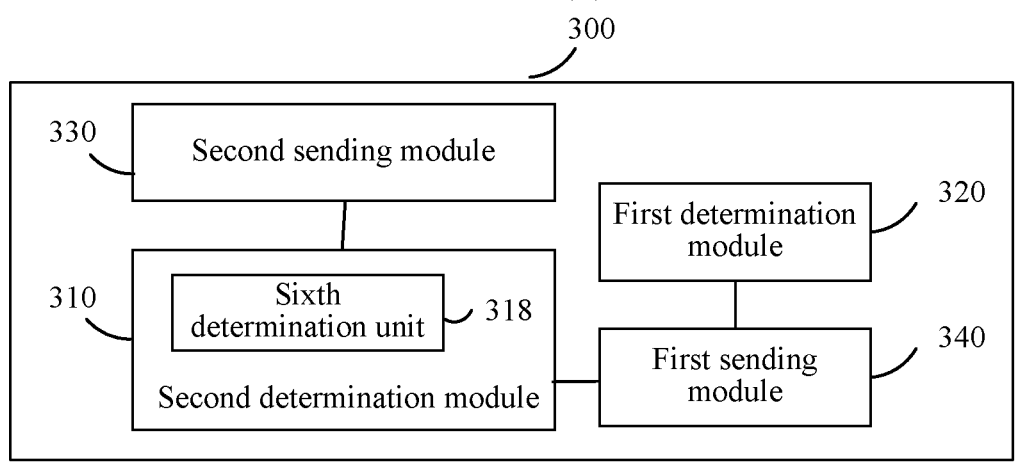

In addition to determining the at least one second device adjacent to the first device by using, but not limited to, the several possible manners described in the foregoing, the apparatus of this embodiment may determine the at least one second device by querying directly, thereby sending, to the determined at least one second device, the information related to the channel state that is determined by the first determination module 320. In such an implementation manner, as shown in FIG. 3(g), the apparatus 300 may further comprise:

a second sending module 330, configured to send a query message, wherein the query message is used to query another device whether the information related to the channel state of the at least one channel between the first device and the access point device is needed.

In a case that the at least one second device has not been determined yet, the second sending module 330 may send the query message by broadcasting.

Or, the apparatus of this embodiment has known or has determined at least one second device by using, but not limited to, several possible manners of the foregoing example, and the second sending module 330 may directly initiate query to the at least one second device by using identification information (for example, a MAC address) of the at least one second device.

In a case that the at least one second device is not determined, after the second sending module 330 sends the query message, the second determination module 310 determines at least one second device, and as shown in FIG. 3(g), the second determination module 310 may comprise:

a sixth determination unit 318, configured to determine the at least one second device at least according to a response to the query message.

Figure 3H:
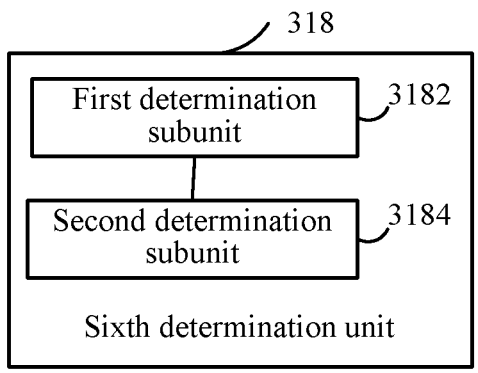

After sending the query message, the apparatus of this embodiment may receive a response to the query message from another device, and the response may directly come from another device or may come from the first device. As shown in FIG. 3(h), the sixth determination unit 318 may further comprise: a first determination subunit 3182 and a second determination subunit 3184.

The first determination subunit 3182 is configured to determine the distance between a device corresponding to the response and the first device at least according to the response to the query message.

Optionally, the first determination subunit 3182 may determine the distance between the device corresponding to the response and the first device according to a Received Signal Strength Indication (RSSI), that is, the signal strength of a response signal. In an implementation manner that the response signal comprises position information of the corresponding device, the distance between the two may be determined according to the position information of the device corresponding to the response signal and position information of the first device. The distance between the device corresponding to the response and the first device may be determined by using any other possible manner.

The second determination subunit 3184 is configured to determine the at least one second device at least according to the determined distance.

Figure 3I:
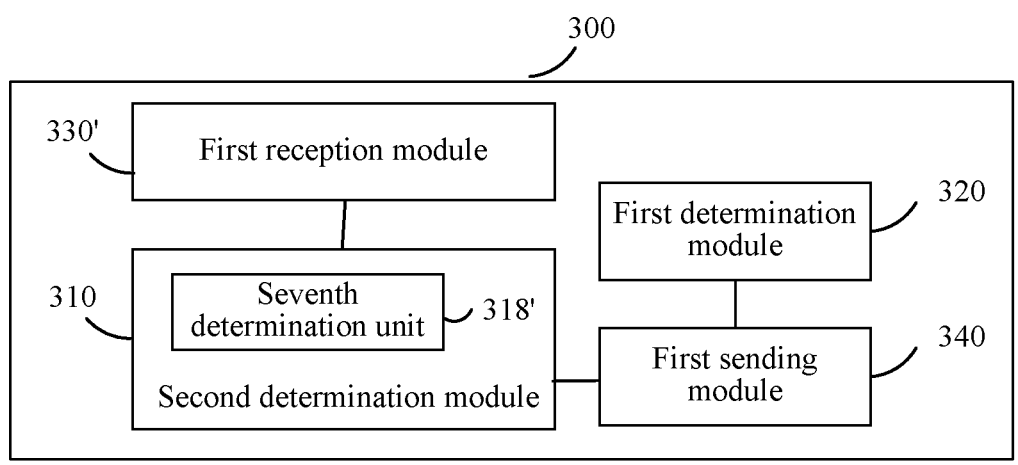

In still another possible implementation manner, when receiving or demodulating the data signal of the access point device, another device may actively initiate, to the first device, a request message for the information related to the channel state of the at least one channel between the first device and the access point device. In such an implementation manner, as shown in FIG. 3(i), the apparatus 300 may further comprise:

a first reception module 330', configured to receive a request message for the information related to the channel state of at least one channel between the first device and the access point device.

In a case that the at least one second device has not been determined yet, after the first reception module 330' receives the request message, the second determination module 310 determines the at least one second device, and the second determination module 310 may comprise:

a seventh determination unit 318', configured to determine the at least one second device at least according to the request message.

Figure 3J:
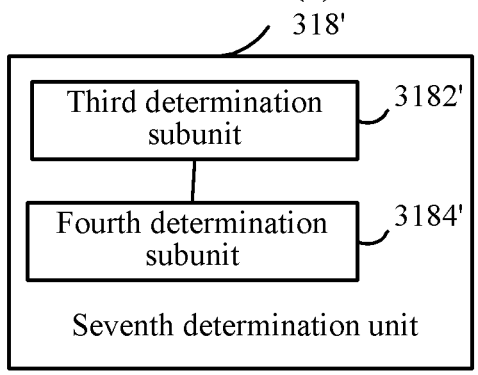

As shown in FIG. 3(j), the seventh determination unit 318' may further comprise: a third determination subunit 3182' and a fourth determination subunit 3184'.

The third determination subunit 3182' is configured to determine the distance between a device corresponding to the request message and the first device at least according to the request message.

Optionally, the distance between the device corresponding to the request message and the first device may be determined according to the RSSI, that is, the signal strength of the request signal. In an implementation manner that the request signal comprises position information of the corresponding device, the distance between the two may be determined according to the position information of the device corresponding to the request message and position information of the first device. The distance between the device corresponding to the request message and the first device may be determined by using any other possible manner.

The fourth determination subunit 3184' is configured to determine the at least one second device at least according to the determined distance.

After the distance between the corresponding device and the first device is determined, a device located within the preset distance range is determined as the at least one second device.

In view of the foregoing, the apparatus of this embodiment shares the parameter related to a channel state according to proximity relationship between devices, so that each device does not need to calculate a parameter related to the channel state respectively, thereby being conducive to determining the channel state in a low complexity and low power consumption, and performing wireless communication in a short delay.

Figure 4A:
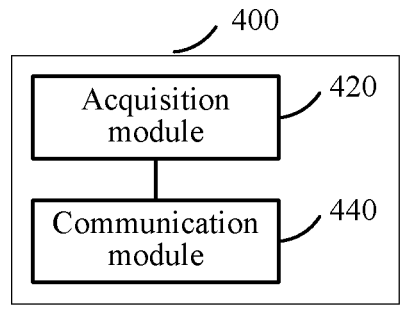
FIG. 4(a) to FIG. 4(i) are example structural block diagrams of several examples of a wireless communication apparatus according to an embodiment of the present application.
Figure 4B:
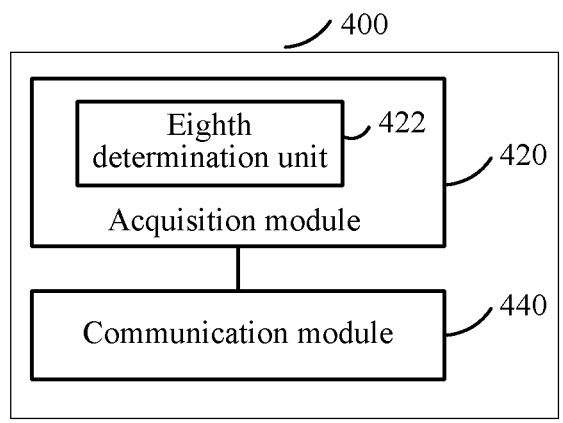
Figure 4C:
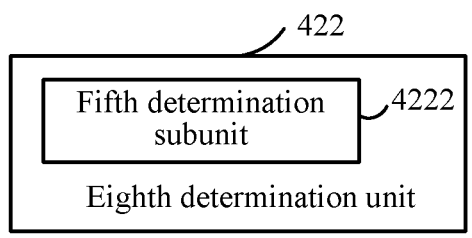
Figure 4D:
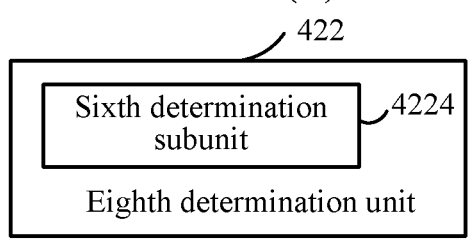
Figure 4E:
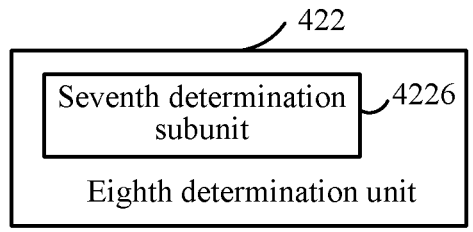
Figure 4F:
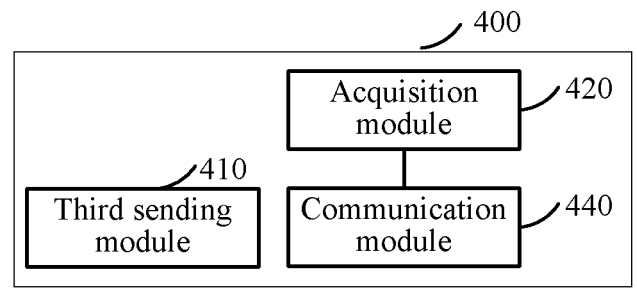
Figure 4G:
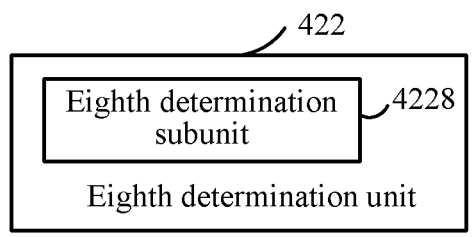
Figure 4H:
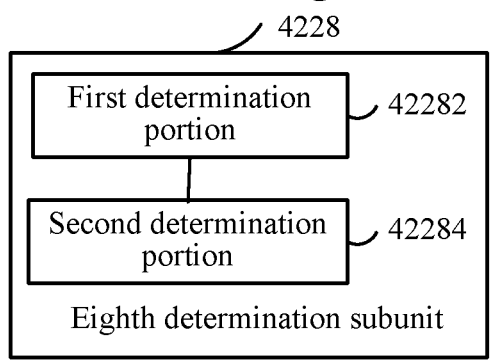
Figure 4I:
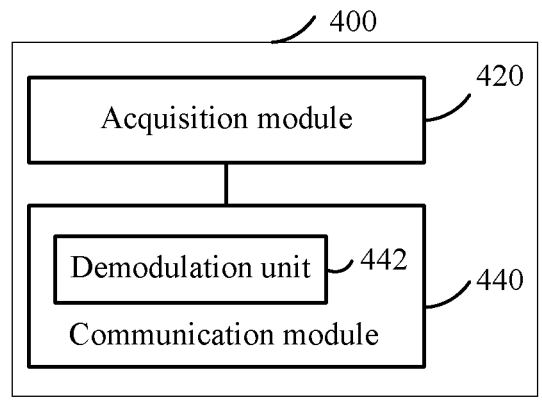

An embodiment of the present invention further provides an apparatus executing the wireless communication method. The apparatus may be an apparatus independent to any second device, and may also belong to any second device. According to requirements of different execution roles of the device, in addition various components described in the following, the apparatus may further comprise a communication module that may implement communication with any device external to the apparatus as required. As shown in FIG. 4(a), a wireless communication apparatus 400 of the embodiment of the present application comprises: an acquisition module 420 and a communication module 440.

The acquisition module 420 is configured to acquire information related to a channel state of at least one channel between at least one first device and an access point device, wherein the first device is located within a preset distance range of a second device.

In the wireless communication apparatus of the embodiment of the present application, when the second device needs to receive or demodulate a data signal from the access point device, the apparatus of this embodiment actively acquires the information related to the channel state of at least one channel between at least one first device and the same access point device, wherein the first device is located within a preset distance range of the second device; therefore, the second device does not need to determine the information by using own calculation resources and time. The information related to the channel state of at least one channel between the at least one first device and the access point device may comprise, but not limited to various types of information that can reflect channel attributes of the at least one channel between the at least one first device and the access point device, such as Channel State Information, a channel matrix, a multipath delay, a Doppler frequency offset, a rank of an MIMO channel, a beam forming vector, signal scattering, environment fading, and power decay of distance. The preset distance range may be set in advance according to factors such as a communication environment and a communication frequency band, and the preset distance range may be any distance range that enables channel states between the two devices and the same access point device to be substantially consistent.

The communication module 440 is configured to perform communication between the second device and the access point device at least based on the information.

As described above, when the two devices are close to each other, channel states between the two and the same access point device may be considered as to be the same. Therefore, in the method of this embodiment, based on the information acquired by the acquisition module 420, the second device can perform communication with the access point device, such as demodulate the data signal from the access point device.

In view of the foregoing, the apparatus of this embodiment can acquire the information related to the channel state based on the proximity relationship between devices, thereby being capable of performing wireless communication in a low complexity, low power consumption and a short delay.

Moreover, as shown in FIG. 4(*b*), the acquisition module 420 may further comprise:

an eighth determination unit 422, configured to determine at least one first device located within a preset distance range of the second device.

According to different roles of the execution apparatus of the method of this embodiment, in a possible implementation manner, one or more first devices within the preset distance range of the second device may be known in a manner of communicating with the second device. In another possible implementation manner, the execution apparatus of the method of this embodiment may determine one or more first devices in the preset distance range of the second device by using various other possible mechanisms. Specifically:

As shown in FIG. 4(*c*), the eighth determination unit 422 may comprise:

a fifth determination subunit 4222, configured to determine the at least one second device from devices that have established communication connections with the second device. Optionally, the established communication connection may be a short distance communication connection, and may comprise, but not limited to: Bluetooth, WiFi, infrared, Zigbee, near field communication NFC, visible light communication, and the like. Two devices that have established the short distance communication connection are close to each other, and one or more first devices may be determined from devices that establish communication connections with the second device in such manner.

As shown in FIG. 4(*d*), the eighth determination unit 422 may comprise:

a sixth determination subunit 4224, configured to determine the at least one first device at least according to a proximity sensor.

In the apparatus of this embodiment, the proximity sensor is mainly configured to detect existence of a target device within a certain distance range of the second device in a non-contact manner. According to the sensing capability of the used proximity sensor, one or more devices within the preset distance range may be detected according to the proximity sensor, thereby determining the at least one first device. The sixth determination subunit 4224 may further improve, by combining the fifth determination subunit 4222, the accuracy of determining the at least one first device. For example, according to a sensing result of the proximity sensor, a part of devices that have established communication connections with the second device but are out of the preset distance range may be excluded, thereby further determining the at least one first device.

Further, as shown in FIG. 4(*e*), the eighth determination unit 422 may comprise:

a seventh determination subunit 4226, configured to determine the at least one first device at least according to relative positions of other devices and the second device.

In a possible manner, the apparatus of this embodiment can acquire position information of the second device and one or more other devices, for example, but not limited to, by using any possible location method, and therefore, the apparatus can determine relative positions between the second device and the one or more other devices, thereby further determining the at least one first device.

In addition to determining the at least one first device adjacent to the second device by using, but not limited to, the several possible manners described above, the apparatus of this embodiment may determine the at least one first device by sending a request for the information, thereby acquiring the information related to the channel state that is determined by the at least one first device. In such an implementation manner, as shown in FIG. 4(*f*), the apparatus 400 may further comprise:

a third sending module 410, configured to: in response to the data signal from the access point device and received by the second device, send a request message for the information to request another device for the information.

In a case that the at least one first device has not been determined yet, the third sending module 410 may send the request message by broadcasting.

Or, the execution apparatus of the method of this embodiment has known or has determined at least one first device by using, but not limited to, several possible manners of the foregoing example, the third sending module 410 may directly send the request to the at least one first device by using identification information (for example, a MAC address) of the at least one first device.

In a case that the at least one first device is not determined, after the third sending module 410 sends the request message, the eighth determination unit 422 determines the at least one first device, and as shown in FIG. 4(*g*), the eighth determination unit 422 may comprise:

an eighth determination subunit 4228, configured to determine the at least one first device at least according to a response to the request message. In a possible implementation manner, after the at least one first device is determined, the apparatus of this embodiment may request the at least one device for the information with various possible short distance communication manners; in another possible implementation manner, the response may comprise the information related to the channel state of the at least one channel between the corresponding device and the access point device.

In a possible implementation manner, as shown in FIG. 4(*h*), the eighth determination subunit 4228 may further comprise: a first determination portion 42282 and a second determination portion 42284.

The first determination portion 42282 is configured to determine the distance between a device corresponding to the response and the second device at least according to the response to the request message.

Optionally, the first determination portion 42282 may determine the distance between the device corresponding to the response and the second device according to a Received Signal Strength Indication (RSSI), that is, the signal strength of a response signal. In an implementation manner that the response signal comprises position information of the corresponding device, the distance between the two may be determined according to the position information of the device corresponding to the response signal and position information of the second device. The distance between the device corresponding to the response and the second device may be determined by using any other possible manner.

The second determination portion 42284 is configured to determine the at least one first device at least according to the determined distance.

After the distance between the corresponding device and the second device is determined, a device located within the preset distance range is determined as the at least one first device.

Moreover, as shown in FIG. 4(*i*), the communication module 440 may further comprise:

a demodulation unit 442, configured to: at least based on the information, demodulate the data signal from the access point device and received by the second device.

Moreover, the acquisition module 420 may also acquire the information from the at least one first device in any of the following possible communication manners, such as Bluetooth, WiFi, infrared, Zigbee, NFC, and visible light communication. If the information related to the channel state is acquired from at least two first devices, the at least two pieces of information related to the channel state may be considered comprehensively, for example, in a process of communication of the second device and the access point device, an average value of parameters comprised in the two pieces of channel state information is used.

In view of the foregoing, the method of this embodiment performs wireless communication by using the shared parameter related to the channel state according to the adjacent relationship between devices, and therefore, the complexity, power consumption and delay are all reduced.

The methods and apparatuses of the embodiments of the present application are further described through specific examples.

Figure 5:
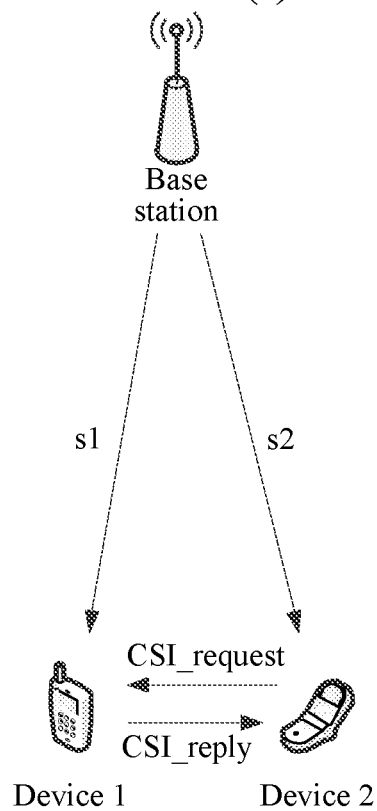
FIG. 5 is an example schematic diagram of an application example of a method and an apparatus according to an embodiment of the present application.

As shown in FIG. 5, it is assumed that a device 1 and a device 2 both communicate with the same base station BS, and respectively receive a data packet s1 and s2 sent from the BS. The device 1 determines channel state information CSI in a process of receiving and demodulating s1. After receiving s2, the device 2 may send a request CSI_request for acquiring the channel state information to the adjacent device 1 by broadcasting (for example, Bluetooth broadcasting), and the device 1 determines, according to the request, that the distance between the device 1 and the device 2 is less than a certain threshold, and replies CSI_reply to the device 2. The device 2 may demodulate the data packet s2 by using the received CSI.

Figure 6:
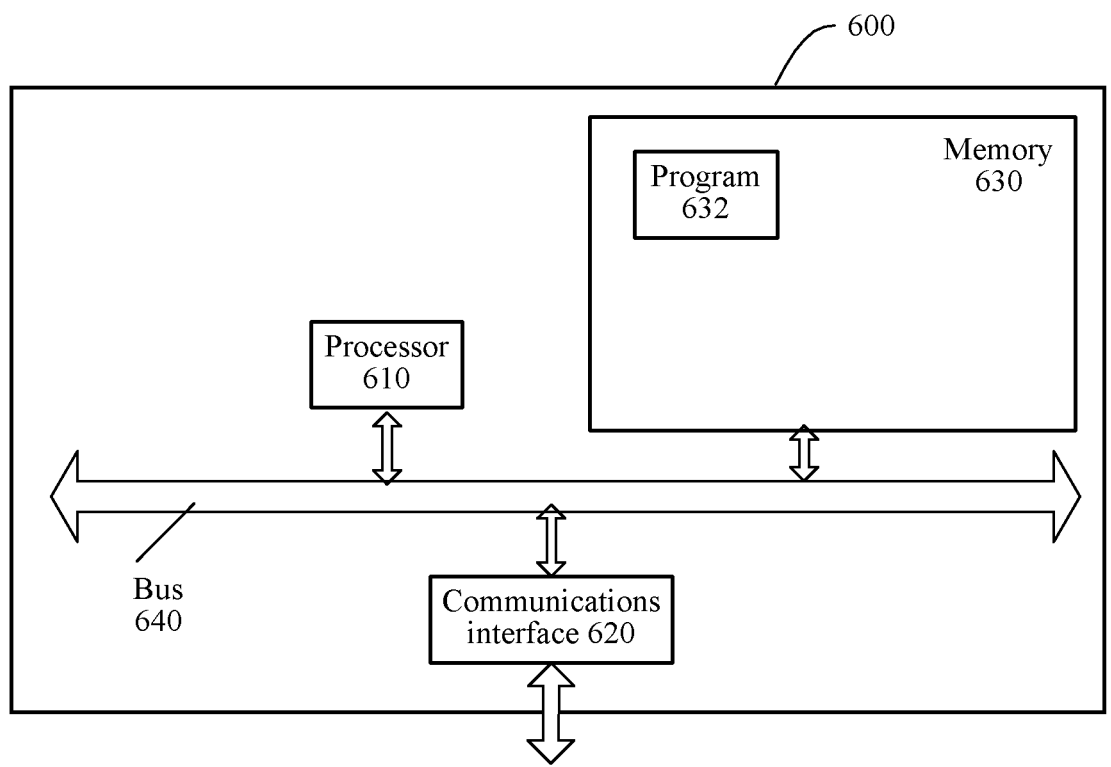
FIG. 6 is an example structural block diagram of another example of an information sharing apparatus according to an embodiment of the present application.

FIG. 6 is a schematic structural diagram of an information sharing apparatus 600 provided in an embodiment of the present application, and the specific implementation of the information sharing apparatus 600 is not limited in the specific implementation of the present application. As shown in FIG. 6, the information sharing apparatus 600 may comprise:

A processor 610, a communications interface 620, a memory 630, and a communications bus 670, where:

The processor 610, the communications interface 620, and the memory 630 complete mutual communications with each other through the communications bus 640.

The communications interface 620 is configured to communicate with a network element such as a client.

The processor 610 is configured to execute a program 632, and specifically can implement related functions of the information sharing apparatus in the system embodiment shown in FIG. 3(*a*).

Specifically, the program 632 may comprise a program code, wherein the program code comprises a computer operating instruction.

The processor 610 may be a central processing unit CPU or an Application Specific Integrated Circuit (ASIC), or one or more integrated circuits configured to implement the embodiments of the present application.

The memory 630 is configured to store the program 632. The memory 630 may comprise a high-speed RAM memory and may also further comprise a non-volatile memory, for example, at least one magnetic disk memory. The program 632 specifically may execute the following steps:

determining information related to a channel state of at least one channel between a first device and an access point device; and sending the information to at least one second device located within a preset distance range of the first device.

For specific implementations of all steps in the program 632, reference may be made to the corresponding descriptions of the corresponding steps or units in the foregoing embodiments, and no further details are provided herein. A person skilled in the art may clearly know that, for the purpose of convenient and brief description, for a detailed working process of the described devices and modules, reference may be made to descriptions of corresponding processes in the foregoing method embodiment, and no further details are provided herein.

Figure 7:
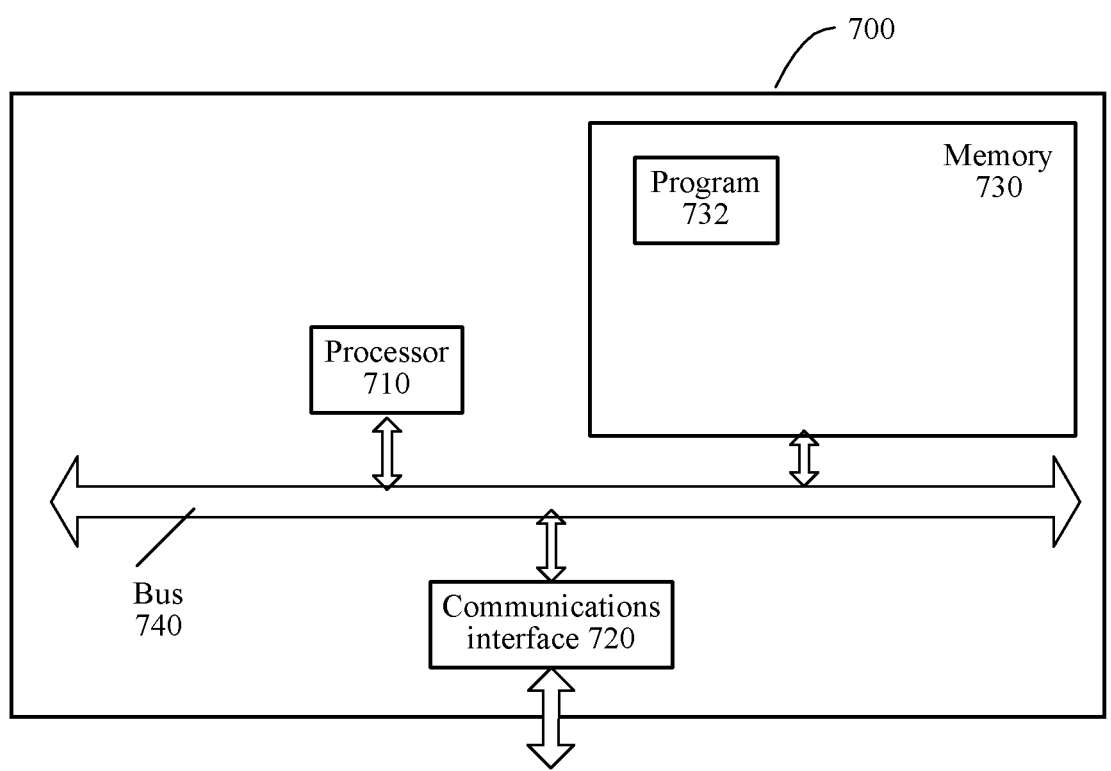
FIG. 7 is an example structural block diagram of another example of a wireless communication apparatus according to an embodiment of the present application.

FIG. 7 is a schematic structural diagram of a wireless communications apparatus 700 provided in an embodiment of the present application, and the specific implementation of the wireless communications apparatus 700 is not limited in the specific implementation of the present application. As shown in FIG. 7, the wireless communications apparatus 700 may comprise:

A processor 710, a communications interface 720, a memory 730, and a communications bus 770, where:

The processor 710, the communications interface 720, and the memory 730 complete mutual communications with each other by using the communications bus 740.

The communications interface 720 is configured to communicate with a network element such as a client.

The processor 710 is configured to execute a program 732, and specifically can implement related functions of the wireless communication apparatus in the system embodiment shown in FIG. 4(*a*).

Specifically, the program 732 may comprise program code, wherein the program code comprises a computer operating instruction.

The processor 710 may be a central processing unit CPU or an Application Specific Integrated Circuit (ASIC), or one or more integrated circuits configured to implement the embodiments of the present application.

The memory 730 is configured to store the program 732. The memory 730 may comprise a high-speed RAM memory and may also further comprise a non-volatile memory, for example, at least one magnetic disk memory. The program 732 specifically may execute the following steps:

acquiring information related to a channel state of at least one channel between at least one first device and an access point device, wherein the first device is located within a preset distance range of a second device; and performing communication between the second device and the access point device at least based on the information.

For specific implementations of all steps in the program 732, reference may be made to the corresponding descriptions of the corresponding steps or units in the foregoing embodiments, and no further details are provided herein. A person skilled in the art may clearly know that, for the purpose of convenient and brief description, for a detailed working process of the described devices and modules, reference may be made to descriptions of corresponding processes in the foregoing method embodiment, and no further details are provided herein.

Although the theme described herein is provided in a general context executed in combination with the operating system and execution of an application on a computer system, a person skilled in the art may know that other implementations may also be executed in combination with other types of program modules. Generally speaking, the program module comprises a routine, a program, a component, a data structure and other types of structures used to execute a specific task or implement a specific abstract data type. A person skilled in the art may understand that, the theme described herein may be implemented by using another computer system configuration, comprising a handheld device, a multi-processor system, a micro-processor based or programmable consumer electronic product, a small-size computer, a large-size computer, and the like, and may also be used in a distributed computing environment in which a task is executed by using remote processing devices connection through a communication network. In the distributed computing environment, the program module may be located within storage devices of both a local memory and a remote memory.

A person of ordinary skill in the art may be aware that, with reference to the examples described in the embodiments disclosed in this specification, units and algorithm steps may be implemented by electronic hardware, or a combination of computer software and electronic hardware. Whether the functions are executed by hardware or software depends on specific applications and design constraint conditions of the technical solutions. A person skilled in the art may use different methods to implement the described functions for every specific application, but it should not be considered that this implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and comprises several instructions for instructing a computer device (which may be a personal computer, a server, a network device, and the like) to perform all or part of the steps of the method described in each of the embodiments of the present application. The computer readable storage medium comprises a physically volatile and non-volatile, mobile, and non-mobile medium that is implemented by any manner or technology for storing information such as a computer readable instruction, a data structure, a program module, or other data. The computer readable storage medium specifically comprises, but is not limited to, a USB disk, a mobile hard disk, a Read-Only Memory (ROM), a Random Access Memory (RAM), an Erasable Programmable Read-Only Memory (EPROM), an electrically Erasable Programmable Read-Only Memory (EEPROM), a flash memory or another solid-state memory technology, a CD-ROM, a digital versatile disc (DVD), an HD-DVD, a Blue-Ray or another optical storage device, a magnetic tape, a magnetic disk storage or another magnetic storage device, or any other medium that can be used to store required information and can be accessed by the computer.

The foregoing implementation manners are merely used for describing the present application, rather than limiting the present application. A person of ordinary skill in the art may made various changes and modifications without departing from the spirit and scope of the present application, and therefore, all equivalent technical solutions shall belong to the scope of the present application, and the protection scope of the present application shall be subject to the claims.

What is claimed is:

1. A wireless communication method, comprising:
   determining a preset distance range from a second device;
   determining at least one first device which is located within the preset distance range from the second device and which has a channel state between the at least one first device and an access point device that is considered to be same as a channel state between the second device and the access point device;
   acquiring information related to a channel state of at least one channel between the at least one first device and the access point device; and
   performing communication between the second device and the access point device at least based on the acquired information.

2. The method of claim 1, wherein the determining at least one first device which is located within the preset distance range from the second device comprises:
   determining the at least one first device from devices that have established communication connections with the second device.

3. The method of claim 1, wherein the determining at least one first device which is located within the preset distance range from the second device comprises:
   determining the at least one first device at least according to a proximity sensor.

4. The method of claim 1, wherein the determining at least one first device which is located within the preset distance range from the second device comprises:
   determining the at least one first device at least according to positions of other devices relative to the second device.

5. The method of claim 1, wherein the method further comprises:
   sending a request message for the information in response to a data signal from the access point device and received by the second device; and
   the determining at least one first device which is located within the preset distance range of the second device comprises:
   determining the at least one first device at least according to a response to the request message.

6. The method of claim 5, wherein the response comprises the information related to the channel state of at least one channel between a corresponding device and the access point device.

7. The method of claim 5, wherein the determining the at least one first device at least according to a response to the request message comprises:
   determining a distance between a device corresponding to the response and the second device according to a signal strength of the response; and
   determining the at least one first device at least according to the determined distance.

8. A wireless communication apparatus, comprising:
   an acquisition module, configured to determine a preset distance range from a second device; determine at least one first device which is located within the preset distance range from the second device and which has a channel state between the at least one first device and an access point device that is considered to be same as a channel state between the second device and the access point device; and acquire information related to a channel state of at least one channel between the at least one first device and the access point device; and
   a communication module, configured to perform communication between the second device and the access point device at least based on the acquired information.

9. An apparatus for wireless communication comprising a processor and memory, the memory storing computer executable instructions, the processor being connected with the memory via a communication bus, wherein when the device is operating, the processor executes or facilitates execution of the executable instructions stored by the memory to perform operations comprising:
   determining a preset distance range from a second device;
   determining at least one first device which is located within the preset distance range from the second device and which has a channel state between the at least one first device and an access point device that is considered to be same as a channel state between the second device and the access point device;
   acquiring information related to a channel state of at least one channel between the at least one first device and the access point device; and
   performing communication between the second device and the access point device at least based on the acquired information.

10. The apparatus of claim 9, wherein the operations further comprise:
    determining that the at least one first device is located within the preset distance range of the second device.

11. The apparatus of claim 10, wherein the operations further comprise:
    determining the at least one first device from devices that have established communication connections with the second device.

12. The apparatus of claim 10, wherein the operations further comprise:
    determining the at least one first device at least according to a proximity sensor.

13. The apparatus of claim 10, wherein the operations further comprise:
    determining the at least one first device at least according to positions of other devices relative to the second device.

14. The apparatus of claim 10, wherein the operations further comprise:
    sending a request message for the information in response to a data signal from the access point device and received by the second device; and
    determining the at least one first device at least according to a response to the request message.

15. The apparatus of claim 14, wherein the operations further comprise sending the request message by broadcasting.

16. The apparatus of claim 14, wherein the operations further comprise:
    determining the distance between a device corresponding to the response and the second device at least according to the response to the request message; and
    determining the at least one first device at least according to the determined distance.

17. The apparatus of claim 16, wherein the operations further comprise determining a distance between a device corresponding to the response and the second device according to a signal strength of the response, and determining the at least one first device at least according to the determined distance.

18. The apparatus of claim 9, wherein the operations further comprise:
    at least based on the information, demodulating a data signal from the access point device and received by the second device.

19. A non-transitory computer readable storage device, comprising at least one executable instruction, which, in response to execution, causes a system comprising a processor to perform operations, comprising:
    determining a preset distance range from a second device;
    determining at least one first device which is located within the preset distance range from the second device and which has a channel state between the at least one first device and an access point device that is considered to be same as a channel state between the second device and the access point device;
    acquiring information related to a channel state of at least one channel between the at least one first device and the access point device; and
    performing communication between the second device and the access point device at least based on the acquired information.

* * * * *